United States Patent
Ikeda et al.

(10) Patent No.: US 7,159,925 B2
(45) Date of Patent: Jan. 9, 2007

(54) SUN VISOR FOR VEHICLE

(75) Inventors: Koji Ikeda, Wako (JP); Toshikazu Hirose, Wako (JP); Tadao Goto, Wako (JP); Hiroyuki Hirayama, Wako (JP); Takatomo Watanabe, Haga-gun (JP); Junichi Soga, Toyota (JP)

(73) Assignees: Honda Motor Co., Ltd., Tokyo (JP); Kyowa Sangyo Co., Ltd., Toyota (JP)

( * ) Notice: Subject to any disclaimer, the term of this patent is extended or adjusted under 35 U.S.C. 154(b) by 0 days.

(21) Appl. No.: 11/348,964

(22) Filed: Feb. 7, 2006

(65) Prior Publication Data

US 2006/0175861 A1 Aug. 10, 2006

(30) Foreign Application Priority Data

Feb. 8, 2005 (JP) ............................. 2005-031506

(51) Int. Cl.
*B60J 1/02* (2006.01)
(52) U.S. Cl. ................... 296/97.11; 296/97.12; 296/97.13
(58) Field of Classification Search ............... 296/97.4, 296/97.9, 97.11, 97.12, 97.13
See application file for complete search history.

(56) References Cited

U.S. PATENT DOCUMENTS 6,059,348 A * 5/2000 Viertel et al. ............... 296/97.9
6,264,264 B1 * 7/2001 Kato et al. ................ 296/97.12
2005/0206187 A1 * 9/2005 Torii ........................ 296/97.13

FOREIGN PATENT DOCUMENTS

| JP | 2003-312258 | 11/2003 |
| JP | 2004-98748 | 4/2004 |

\* cited by examiner

*Primary Examiner*—Lori L. Coletta
(74) *Attorney, Agent, or Firm*—Rankin, Hill, Porter & Clark LLP

(57) ABSTRACT

A sun visor for a vehicle includes a shaft 10 angularly movably mounted on a roof surface within a passenger compartment of the vehicle, and a shielding plate angularly movably mounted on the shaft 10. A holder 30 and a stabilizer 70, in which the shaft 10 is angularly movably inserted, are provided at an end portion of the shielding plate, and a first projection 20A and a second projection 20B are formed on the shaft 10, and are spaced from each other in a direction of an axis of the shaft. The distance between the second projection 20B and the tubular portion 71 is larger than the distance between the first projection 20A and the bearing portion 33.

6 Claims, 7 Drawing Sheets

SUN VISOR FOR VEHICLE

BACKGROUND OF THE INVENTION

This invention relates to a sun visor for a vehicle.

Generally, a sun visor for a vehicle is mounted on a roof surface within a passenger compartment of the vehicle, and is disposed near to a front glass. The sun visor includes a shielding plate angularly movably supported on a shaft angularly movably mounted on a vehicle body. By angularly moving the shaft relative to the vehicle body, the shielding plate can be located along the front glass or a front door glass, and also by angularly moving the shielding plate relative to the shaft, the angle of use of the shielding plate can be changed.

Incidentally, in a vehicle equipped with an airbag device, in some cases, a force, tending to withdraw or disengage the shielding plate from the shaft, acts on the sun visor upon deployment (or expansion) of an airbag.

For example, when a shielding plate 101 of a sun visor 100 for a driver's seat is located along a front glass 110 as shown in FIG. 10, and a driver's seat airbag 111, stored in a steering wheel (not shown), is deployed to strike against the shielding plate 101, a force, tending to withdraw the shielding plate 101 from a shaft 102, acts, in some cases, on the sun visor.

Also, when the shielding plate 101 of the sun visor 100 for the driver's seat is located along a front door glass 112 as shown in FIG. 10, and a side curtain airbag 113, stored in a side portion of a roof of the vehicle, is deployed to strike against the shielding plate 101, a force, tending to withdraw the shielding plate 101 from the shaft 102, acts, in some cases, on the sun visor. This is also the case with a sun visor for a front passenger seat adjacent to the driver's seat.

Therefore, such a vehicular sun visor employs a retaining structure for preventing the shielding plate from being disengaged from the shaft.

For example, Patent Literature 1 discloses a sun visor in which a retaining projection is formed on a shaft, and this retaining projection abuts against a shaft receiving portion of a shielding plate, thereby preventing the shielding plate from moving in a direction of an axis of the shaft.

Patent Literature 2 discloses a sun visor in which two retaining projections are formed on a shaft, and the two retaining projections abut against shaft receiving portions of a shielding plate, thereby preventing the shielding plate from moving in a direction of an axis of the shaft.

[Patent Literature 1] JP-A-2004-98748
[Patent Literature 2] JP-A-2003-312258

In the sun visor of Patent Literature 1, however, there is provided only one retaining projection, and therefore in order to secure a sufficient strength to positively prevent the disengagement of the shielding plate, the retaining projection must be increased in size, and as a result there is encountered a problem that the shaft receiving portion has an increased size, so that the overall size of the sun visor increases.

In the sun visor of Patent Literature 2, since the two retaining projections are designed to abut against the shaft receiving portions at the same time, the force can be distributed or divided. Therefore, a predetermined strength can be secured even if each of the two retaining projections has a small size. However, the two retaining projections are brought into abutting engagement with the shaft receiving portions at the same timing, and therefore this impact must be received at a time, and the force to be borne by each retaining projection is still large though the force is distributed or divided. As a result, each retaining projection still has an increased size.

SUMMARY OF THE INVENTION

It is therefore an object of this invention to provide a sun visor for a vehicle in which the impact is distributed or divided with time, thereby positively preventing withdrawal of a shielding member.

The above problems are achieved by a vehicular sun visor (for example, a sun visor 1 in embodiments described later) of the invention of claim 1 comprising a shaft (for example, a shaft 10 in the following embodiments) angularly movably mounted on a roof surface (for example, a roof surface 90a in the following embodiments) within a passenger compartment of the vehicle, and a shielding member (for example, a shielding plate 50 in the following embodiments) angularly movably mounted on the shaft; characterized in that a bearing member (for example, a holder 30 and a stabilizer 70 in the following embodiments), in which the shaft is angularly movably inserted, is provided at an end portion of the shielding member; and a plurality of projections (for example, first, second and third projections 20A, 20B and 20C in the following embodiments) are formed on the shaft, and are spaced from each other in a direction of an axis of the shaft; and retaining portions (for example, a bearing portion 33 and a tubular portion 71 in the following embodiments) which can abut respectively against the projections are provided at the bearing member; and the bearing member has passage portions (for example, grooves 36, 37 and 75 in the following embodiments), and the projections can pass through the corresponding passage portions outside the range of angular movement of the shielding member mounted on the vehicle; and the distances of the projections from the respective retaining portions are different from one another.

With this construction, when the sun visor is mounted on the vehicle, the projections of the shaft can not pass through the passage portions of the bearing member. And besides, the timings at which the projections of the shaft abut respectively against the retaining portions of the bearing members can be staggered.

In the invention of claim 1, when the sun visor is mounted on the vehicle, the projections of the shaft can not pass through the passage portions of the bearing member, and therefore the shielding member will not be easily withdrawn or disengaged from the shaft. And besides, the timings at which the projections of the shaft abut respectively against the retaining portions of the bearing members can be staggered, and therefore the impact can be distributed or divided with time, and the projections of the shaft are sequentially brought into abutting engagement with the respective retaining portions of the bearing member, while attenuating the energy of the impact. Therefore, the shielding member can be positively prevented from being withdrawn or disengaged from the shaft.

DETAILED DESCRIPTION OF THE PREFERRED EMBODIMENTS

Preferred embodiments of a vehicular sun visor of the present invention will now be described with reference to FIGS. 1 to 9.

Figure 1:
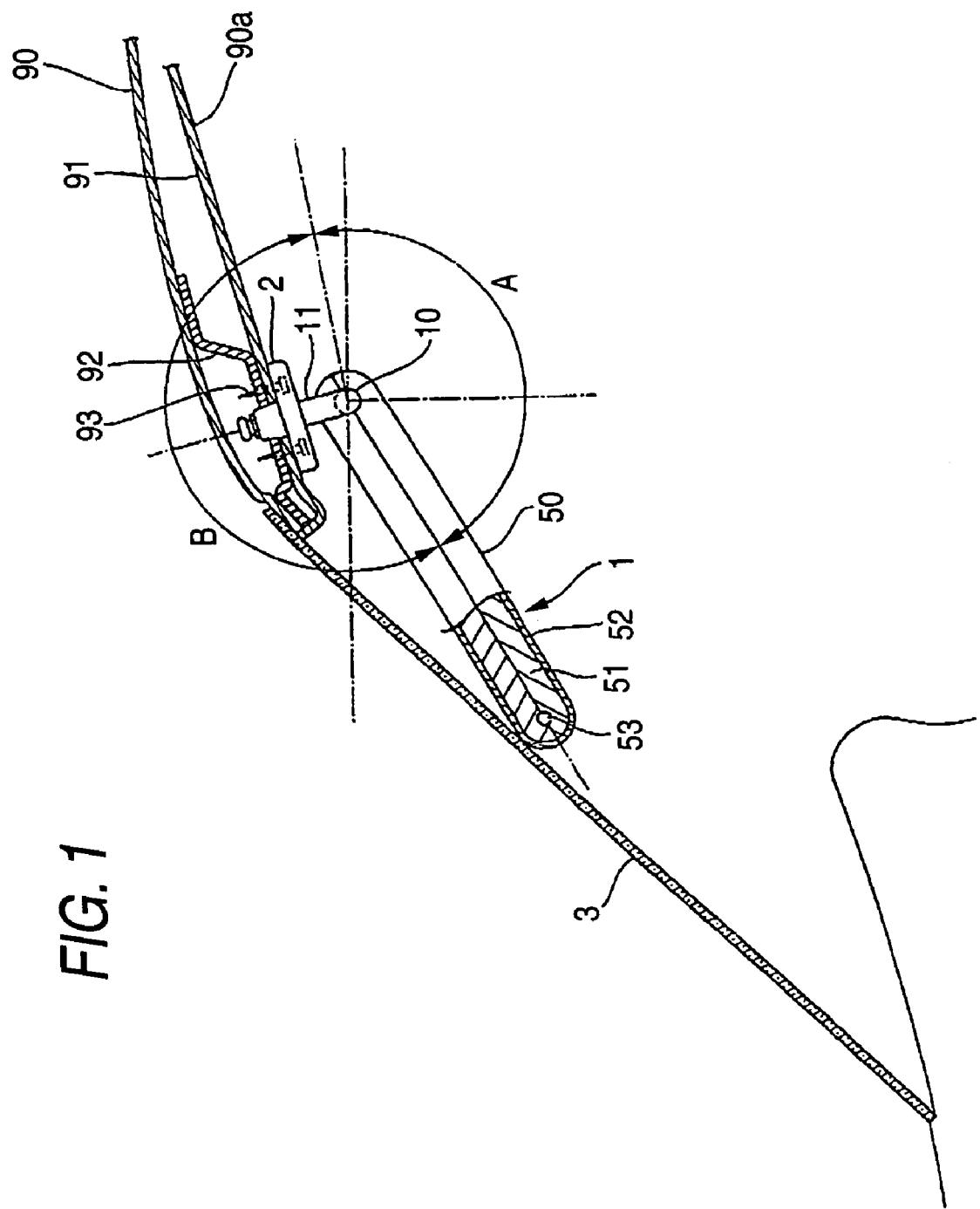
FIG. 1 is a view showing a vehicular sun visor of the present invention in its installed condition.
Figure 2:
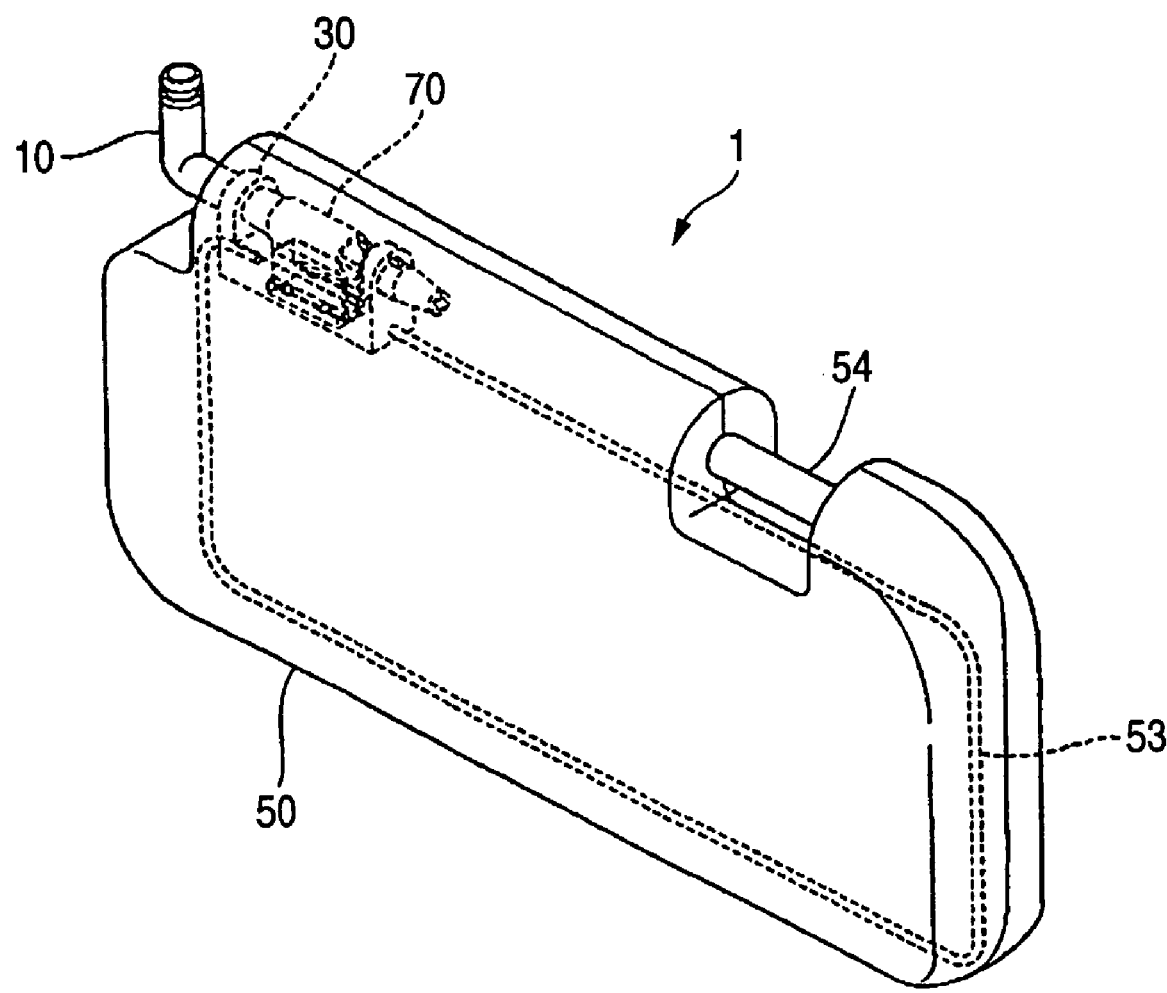
FIG. 2 is a perspective view of the vehicular sun visor.

As shown in FIGS. 1 and 2, the sun visor 1 comprises a shaft 10 mounted on a vehicle body 90 through a bracket 2, a holder 30 rotatably supported on the shaft 10, a shielding plate (shielding member) 50 mounted on the holder 30, and a stabilizer 70 mounted on the holder 30 so as to hold a posture (angle) of the shielding plate 50. In this embodiment, the holder 30 and the stabilizer 70 jointly form a bearing member.

A shorter portion 11 of the shaft 10 is rotatably (or angularly movably) supported in the bracket 2, and this bracket 2 is mated with a roof panel interior member 91, and is fixed to a roof panel inner member 92 by screws 93. Namely, the shaft 10 is angularly movably mounted on a roof surface 90a within a passenger compartment of a vehicle through the bracket 2.

Figure 3:
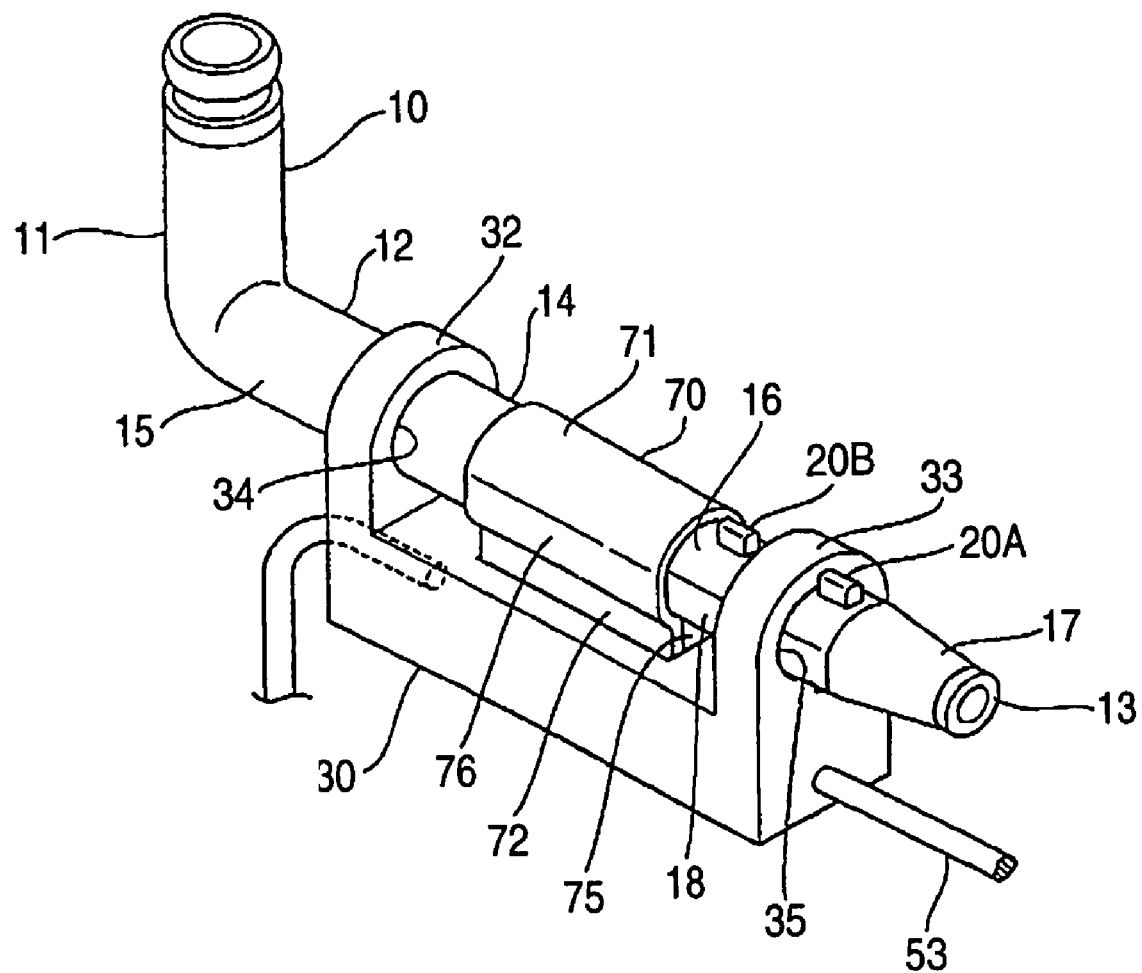
FIG. 3 is an enlarged, perspective view of an important portion of the sun visor.
Figure 4:
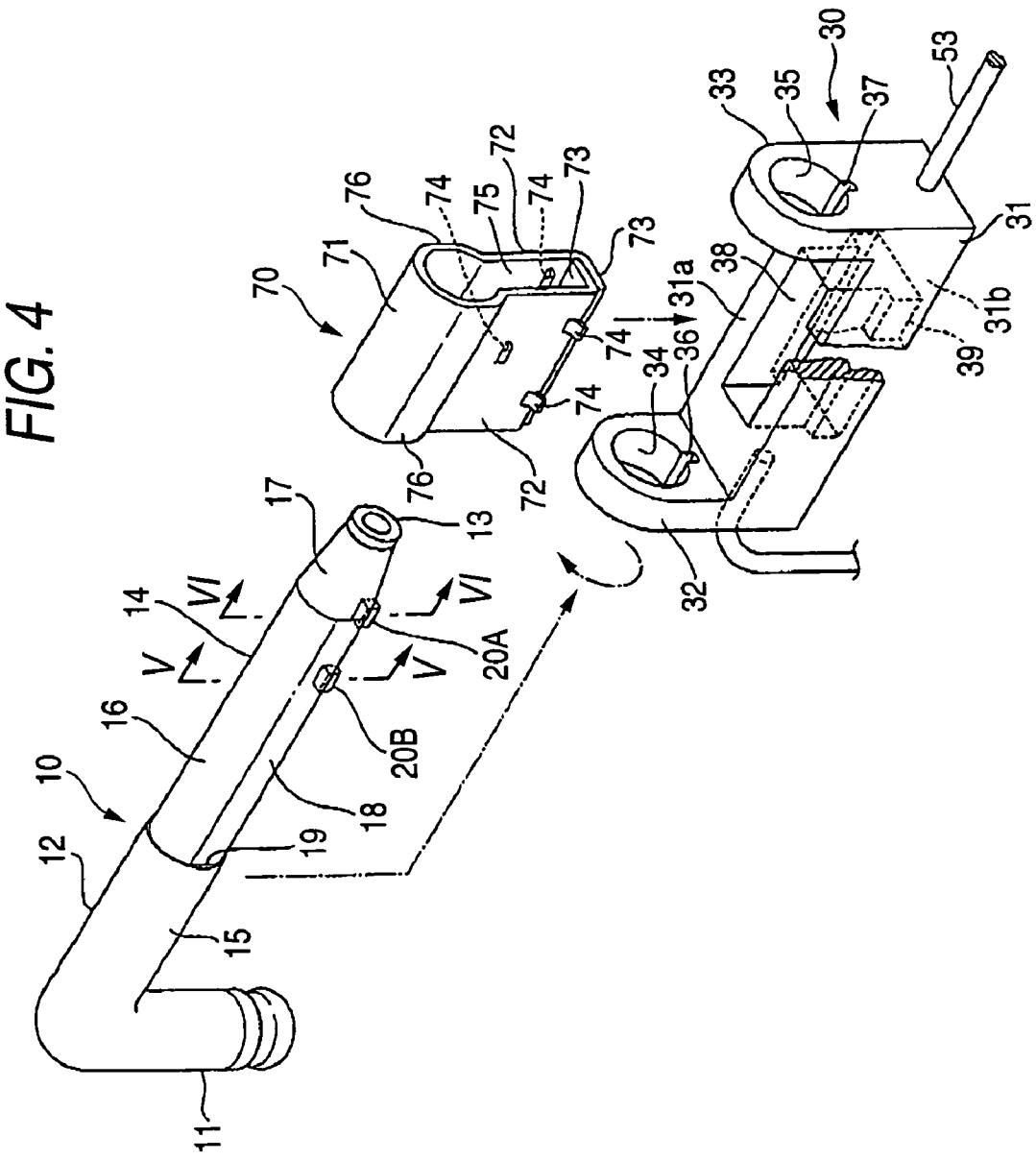
FIG. 4 is an exploded, perspective view of the above important portion.

As shown in FIGS. 2 to 4, the shaft 10 has a generally L-shape, and includes the shorter portion 11 and a longer portion 12. The shaft 10 includes a core rod 13 in the form of a metallic pipe, and a resin layer 14 formed on an outer surface of the core rod 13. The longer portion 12 includes a larger-diameter portion 15 extending from the shorter portion 11, a smaller-diameter portion 16 smaller in diameter than the larger-diameter portion 15, and a tapering portion 17 extending from a distal end of the smaller-diameter portion 16 and decreasing gradually in diameter. A pair of flat surfaces 18 are formed on the smaller-diameter portion 16, and are spaced an angle of 180 degrees from each other in a circumferential direction, the flat surfaces 18 being parallel to a direction of extending of the smaller-diameter portion 11.

Figure 5:
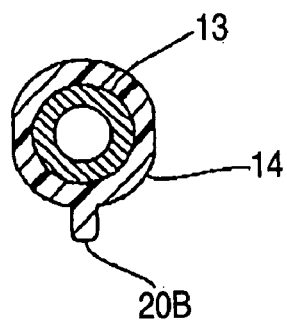
FIG. 5 is a cross-sectional view taken along the line V—V of FIG. 4.
Figure 6:
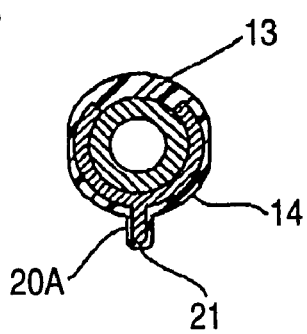
FIG. 6 is a cross-sectional view taken along the line VI—VI of FIG. 4.

Two projections 20A and 20B are formed on the smaller-diameter portion 16, and are disposed at the same position as the shorter portion 11 in the circumferential direction, and are spaced from each other in an axial direction. The first projection 20A is disposed adjacent to the tapering portion 17, and comprises a metallic projecting piece 21 joined to the core rod 13, and the resin layer 14 covering an outer surface of the projecting piece 21 as shown in FIG. 6. The second projection 20B is spaced a predetermined distance from the first projection 20A toward the shorter portion 11, and includes only the resin layer 14 as shown in FIG. 5. The projections 20A and 20B have the same shape and the same size.

As shown in FIGS. 3 and 4, the holder 30 is made of a resin, and includes a base portion 31, and bearing portions 32 and 33 extending upwardly respectively from opposite ends of the base portion 31. A space for the mounting of the stabilizer 70 therein is formed between the two bearing portions 32 and 33. A shaft insertion hole 34 of a round shape for the passage of the larger-diameter portion 15 of the shaft 10 therethrough so as to rotatably support the larger-diameter portion 15 is formed through the bearing portion 32. A shaft insertion hole 35 of a round shape for the passage of the smaller-diameter portion 16 of the shaft 10 therethrough so as to rotatably support the smaller-diameter portion 16 is formed through the bearing portion 33. A groove (passage portion) 36 for the passage of the first and second projections 20A and 20B of the shaft 10 therethrough is formed in that portion of an inner surface of the shaft insertion hole 34 disposed close to the base portion 31. A groove (passage portion) 37 for the passage of the first projection 20A of the shaft 10 therethrough is formed in that portion of an inner surface of the shaft insertion hole 35 disposed close to the base portion 31.

A stabilizer mounting hole 38 of a rectangular shape is formed through a central portion of the base portion 31, and extends from an upper surface 31a of the base portion 31 to a lower surface 31b thereof. A lower portion of the stabilizer mounting hole 38, disposed close to the lower surface 31b, is formed into a larger-width hole 39 larger in width than the other portion of the stabilizer mounting hole 38 disposed close to the upper surface 31a.

The stabilizer 70 is formed by pressing a metallic leaf spring material into a generally U-shape, and this stabilizer 70 includes a tubular portion 71 of a generally C-shaped cross-section, a pair of leg portions 72 and 72 depending respectively from lower opposite ends of the tubular portion 71, folded-back portions 73 and 73 folded or turned inwardly respectively from lower ends of the leg portions 72 and 72, and a pair of retaining piece portions 74 and 74 formed on each of the leg portions 72 and 72, each retaining piece portion 74 being formed by bending a tongue-like stamped-out portion of a lower end portion of the leg portion 72 outwardly. A groove (passage portion) 75 is formed between the two leg portions 72 and 72. The tubular portion 71 is so shaped and sized as to allow the smaller-diameter portion 16 of the shaft 10 to pass therethrough. The tubular portion 71 has flat portions 76 and 76 which correspond respectively to the flat surfaces 18 of the smaller-diameter portion 16, and are disposed parallel to the leg portions 72.

As shown in FIG. 1, the shielding plate 50 comprises a cushioning body 51 formed by joining a pair of front and rear cushioning half members (made of a material such as a polyurethane foam having cushioning properties), a covering member 52 covering an outer surface of the cushioning body 51, and a wire-like frame 53 embedded in an outer peripheral portion of the cushioning body 51. As shown in FIG. 2, the holder 30 is contained in an upper portion of the shielding plate 50 at one end portion thereof, and is fixed to the frame 53, and an arm 54 is provided in an exposed manner at the upper portion of the shielding plate 50 at the other end portion thereof. The arm 54 can be retainingly engaged with a hook (not shown), depending from that portion of the roof surface 90a of the vehicle body 90 disposed above a front glass 3 (see FIG. 1), so as to retain the shaft 10 against rotation (or angular movement) against the vehicle body 90. The arm 54 may be integral with the shaft 10 (in which case the shaft 10 is extended long) or may be separate from the shaft 10.

A procedure of assembling this sun visor 1 will be described briefly. First, at the time of molding the holder 30 by the use of the resin, opposite end portions of the frame 53 are insert molded in the holder 30, thereby forming the holder 30 and the frame 53 integrally with each other.

Then, the two leg portions 72 and 72 of the stabilizer 70 are pressed to be moved toward each other against their resilient force, and in this condition the two leg portions 72 and 72 are inserted into the stabilizer mounting hole 38 in the holder 30, and thereafter the pressing of the two leg portions 72 and 72 toward each other is canceled, thereby resiliently restoring the two leg portions 72 and 72, so that the retaining piece portions 74 of the stabilizer 70 are brought into retaining engagement with the larger-width hole 39. By doing so, the stabilizer 70 is mounted on the holder 30, and will not be disengaged from the holder 30 since the retaining piece portions 74 of the stabilizer 70 are retainingly engaged in the larger-width hole 39. FIG. 4 shows a condition in which the two leg portions 72 and 72 are pressed toward each other. A length of the stabilizer 70 in the direction of the axis of the shaft 10 is substantially equal to a length of the stabilizer mounting hole 38 in the direction of the axis of the shaft 10, and the stabilizer 70, mounted on the holder 30, is held against movement in the direction of the axis of the shaft 10 (see FIG. 3).

Figure 7A:
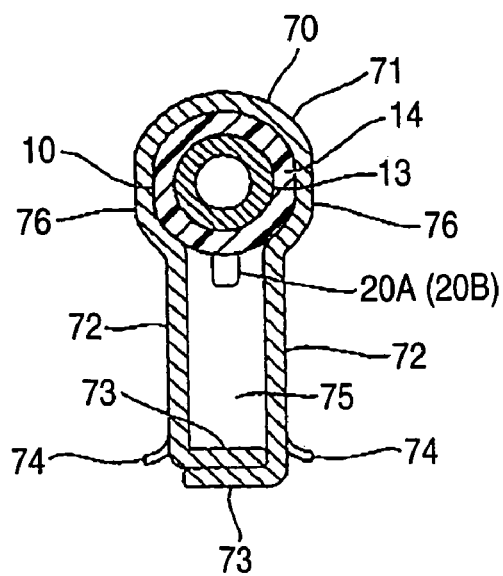
FIG. 7A is a view showing a direction of projecting of a projection at the time of assembling the sun visor.
Figure 7B:
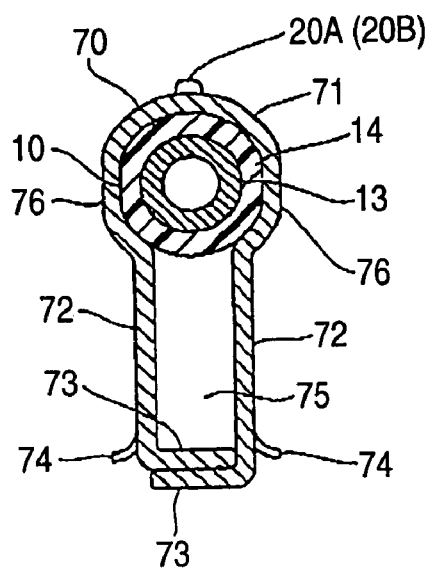
FIG. 7B is a view showing the direction of projecting of the projection after the sun visor is mounted on a vehicle.

Then, the longer portion 12 of the shaft 10 is passed through the shaft insertion holes 34 and 35 in the holder 30 and also through the tubular portion 71 of the stabilizer 70. At this time, the first and second projections 20A and 20B of the shaft 10 are passed through the groove 36 of the shaft insertion hole 34 and then through the groove 75 of the stabilizer 70 as shown in FIG. 7, and further the first projection 20A is passed through the groove 37 of the shaft insertion hole 35. At this time, the flat surfaces 18 of the smaller-diameter portion 16 of the shaft 10 are brought into registry with the flat portions 76 of the tubular portion 71 of the stabilizer 70, and therefore the smaller-diameter portion 16 can be easily passed through the tubular portion 71.

Then, the larger-diameter portion 15 of the shaft 10 is passed through the shaft insertion hole 34 of the bearing portion 32, and the smaller-diameter portion 16 is inserted into the shaft insertion hole 35 of the bearing portion 33, and when a step surface 19, formed between the larger-diameter portion 15 and the smaller-diameter portion 16, is brought into abutting engagement with an end surface of the tubular portion 71 of the stabilizer 70, this inserting operation is completed. In this insertion-completed condition, the first projection 20A, which has passed through the shaft insertion hole 35, is disposed in slightly spaced relation to the bearing portion 33, while the second projection 20B, which has passed through the tubular portion 71 of the stabilizer 70, is disposed between the stabilizer 70 and the bearing portion 33, and the distance between the second projection 20B and the tubular portion 71 is larger than the distance between the first projection 20A and the bearing portion 33. Also, in this insertion-completed condition, the bearing portion 32 of the holder 30 is rotatably supported by the larger-diameter portion 15 of the shaft 10, and the bearing portion 33 is rotatably supported by the smaller-diameter portion 16 of the shaft 10, and the tubular portion 71 of the stabilizer 70 is rotatably supported by the smaller-diameter portion 16 of the shaft 70.

Then, the shaft 10 is rotated through an angle of 180 degrees about the longer portion 12 from the above insertion-completed condition into a condition shown in FIG. 3. As a result, the two projections 20A and 20B of the shaft 10 are spaced 180 degrees from the grooves 36 and 37 of the holder 30 and the groove 75 of the stabilizer 70 in the circumferential direction (see FIG. 7B). Even in this condition, the distance between the second projection 20B and the stabilizer 70 is larger than the distance between the first projection 20A and the bearing portion 33 of the holder 30.

Then, the two halves of the cushioning body 51 are joined together, with the holder 30 and the stabilizer 70 interposed therebetween, and the cushioning body 51 is covered with the covering member 52, and the bracket 2 is mounted on the shorter portion 11 of the shaft 10, thus completing the sun visor 1.

Then, the bracket 2 is fixed to the roof panel inner member 92 by the screws 93, with the distal end of the shorter portion 11 of the shaft 10 directed toward the roof surface 90a of the vehicle body 90. When the sun visor 1 is thus mounted on the vehicle body 90, the two projections 20A and 20B of the shaft 10 project toward the roof surface 90a.

When the sun visor 1 is used in such a manner that the shielding plate 50 can be arranged or located along the front glass 3, the shielding plate 50 can be rotated over a rotation use range A, that is, between a position where the lower end of the shielding plate 50 abuts against the front glass 3 and a position where the lower end of the shielding plate 50 abuts against the roof panel interior member 91. A range outside this rotation use range A is a non-use range (rotation use-outside range) B. When the shielding plate 50 is rotated about the longer portion 12 of the shaft 10, the smaller-diameter portion 16 of the shaft 10 rotates, while pressing the flat portions 76 and 76 of the stabilizer 70 away from each other against the resilient force thereof. Also, the flat portions 76 and 76 of the stabilizer 70 hold the smaller-diameter portion 16 therebetween by their resilient force, thereby holding the rotational angle of the shielding plate 50.

For aligning the two projections 20A and 20B of the shaft 10 with the grooves 36 and 37 of the holder 30 and the groove 75 of the stabilizer 70, the shielding plate 50 and the shorter portion 11 of the shaft 10 must be directed in the same direction. However, after the sun visor 1 is mounted on the vehicle body 90, the shielding plate 50 can not be rotated into the position where the shielding plate 50 is directed in the same direction as the direction of the shorter portion 11. This is the same with the case where the shielding plate 50, when in use, is arranged along the front glass.

Namely, after the sun visor 1 is mounted on the vehicle body, the two projections 20A and 20B of the shaft 10 will not be brought into alignment with the grooves 36, 37 and 75 in the rotation use range A in which the shielding plate 50 can be rotated, and even when the holder 30 moves toward the tapering portion 17 of the shaft 10, the first projection 20A is brought into retaining engagement with the bearing portion 33 of the holder 30 without fail, thereby preventing the movement of the holder 30. Therefore, in a condition of normal use, that is, when the passenger moves the shielding plate 50 toward the front glass 3 or toward the front door glass, or rotates the shielding plate 50 upward and downward, the holder 30 is prevented from being withdrawn or disengaged from the shaft 10, thus preventing the shielding plate 50 from being withdrawn from the shaft 10.

When a force, tending to withdraw or disengage the holder 30 from the shaft 10, acts on the shielding plate 50 in a condition beyond normal use (for example, when an airbag is deployed to strike against the shielding plate 50, so that a force, tending to withdraw the holder 30 from the shaft 10, acts on the shielding plate 50), first, the first projection 20A abuts against the end surface of the bearing portion 33 to retain the holder 30, since the distance between the second projection 20B and the stabilizer 70 is larger than the distance between the first projection 20A and the bearing portion 33 of the holder 30. At this time, the second projection 20B is spaced apart from the stabilizer 70. Here, if the axial movement of the holder 30 is prevented by the abutting engagement of the first projection 20A with the bearing portion 33, then the operation for preventing the disengagement of the shielding plate 50 is completed at this time. Here, the bearing portion 33 serves as a retaining portion for the first projection 20A.

However, if the external force, applied to the shielding plate 50, is so large that the axial movement of the holder 30 can not be prevented only by the retaining engagement of the first projection 20A with the bearing portion 33, the first projection 20A deforms or breaks the bearing portion 33 of the holder 30, so that the axial movement of the holder 30 proceeds. Here, instead of breaking the first projection 20A, the bearing portion 33 of the holder 30 is deformed or broken because the holder 30 is made of the resin whereas the first projection 20A contains the metallic projecting piece 21 therein, and therefore the first projection 20A is higher in mechanical strength than the bearing portion 33.

Then, the second projection 20B abuts against the end surface of the tubular portion 71 of the stabilizer 70, thereby retaining the tubular portion 71. Here, if the axial movement of the holder 30 is prevented by the retaining engagement of the second projection 20B with the tubular portion 71, then the operation for preventing the disengagement of the shielding plate 50 is completed at this time. Here, the tubular portion 71 serves as a retaining portion for the second projection 20B.

However, if the external force, applied to the shielding plate 50, is so large that the axial movement of the holder 30 can not be prevented only by the retaining engagement of the second projection 20B with the tubular portion 71, the tubular portion 71 breaks the second projection 20B, so that the axial movement of the holder 30 further proceeds. Here, instead of breaking the tubular portion 71, the second projection 20B is broken because the second projection 20B is made of the resin whereas the tubular portion 71 of the holder 30 is made of metal, and therefore the tubular portion 71 is higher in mechanical strength than the second projection 20B.

Then, the first projection 20A abuts against the end surface of the tubular portion 71 of the stabilizer 70, thereby retaining the tubular portion 71. Here, the first projection 20A contains the metallic projecting piece 21 therein as described above, and the stabilizer 70 is also made of metal, and therefore the first projection 20A and the tubular portion 71 are brought into metal-to-metal engagement with each other, and therefore have sufficient strengths to withstand the large external force, and will not be deformed. Therefore, the axial movement of the holder 30 can be finally prevented by the retaining engagement of the first projection 20A with the tubular portion 71, thus positively preventing the shielding plate 50 from being withdrawn or disengaged from the shaft 10.

Figure 8:
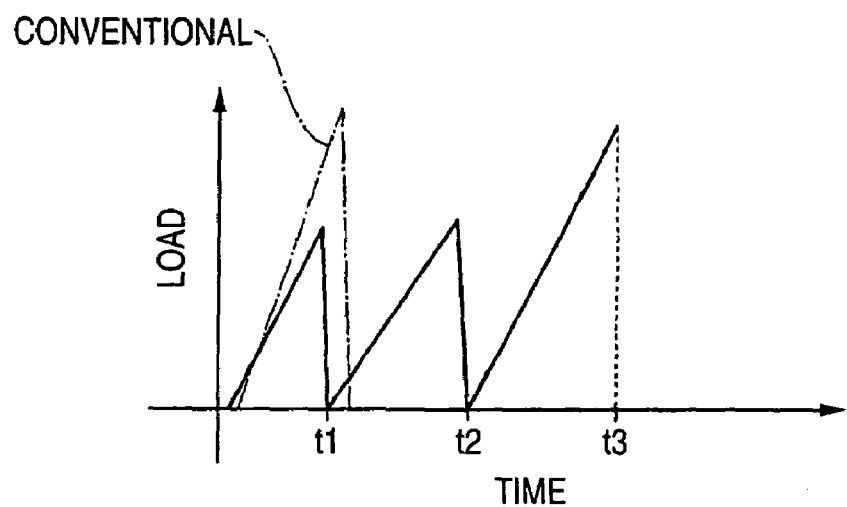
FIG. 8 is a diagram showing a time-varying change of a load applied to a shaft.

FIG. 8 shows a time-varying change of a load applied to the shaft 10. A solid line indicates the sun visor 1 of this embodiment, and time t1 indicates the time at which the first projection 20A broke the bearing portion 33, and time t2 indicates the time at which the tubular portion 71 broke the second projection 20B, and time t3 indicates the time at which the first projection 20A is brought into retaining engagement with the tubular portion 71, thereby stopping the axial movement of the holder 30. In FIG. 8, a dot-and-dash line indicates a time-varying load applied to a shaft of a sun visor of a conventional construction, and the large load acts on this sun visor at a time.

As described above, in the sun visor 1, at first, the bearing portion 33 is caused to strike against the first projection 20A, and then the stabilizer 70 is caused to strike against the second projection 20B, and thereafter the stabilizer 70 is caused to strike against the first projection 20A. Therefore, the impact can be distributed or divided with time. And besides, by deforming or breaking the bearing portion 33 and the second projection 20B, the energy of the external force can be sequentially weakened. Therefore, the shielding plate 50 can be positively prevented from being withdrawn or disengaged from the shaft 10.

In the above embodiment, although the distance between the second projection 20B and the tubular portion 71 of the stabilizer 70 is larger than the distance between the first projection 20A and the bearing portion 33 of the holder 30, this distance relation can be reversed, that is, the distance between the second projection 20B and the tubular portion 71 can be made smaller than the distance between the first projection 20A and the bearing portion 33.

In the above embodiment, although the second projection 20B is made of the resin, it can comprise a metallic projecting piece covered at its outer surface with a resin, as described above for the first projection 20A.

Figure 9:
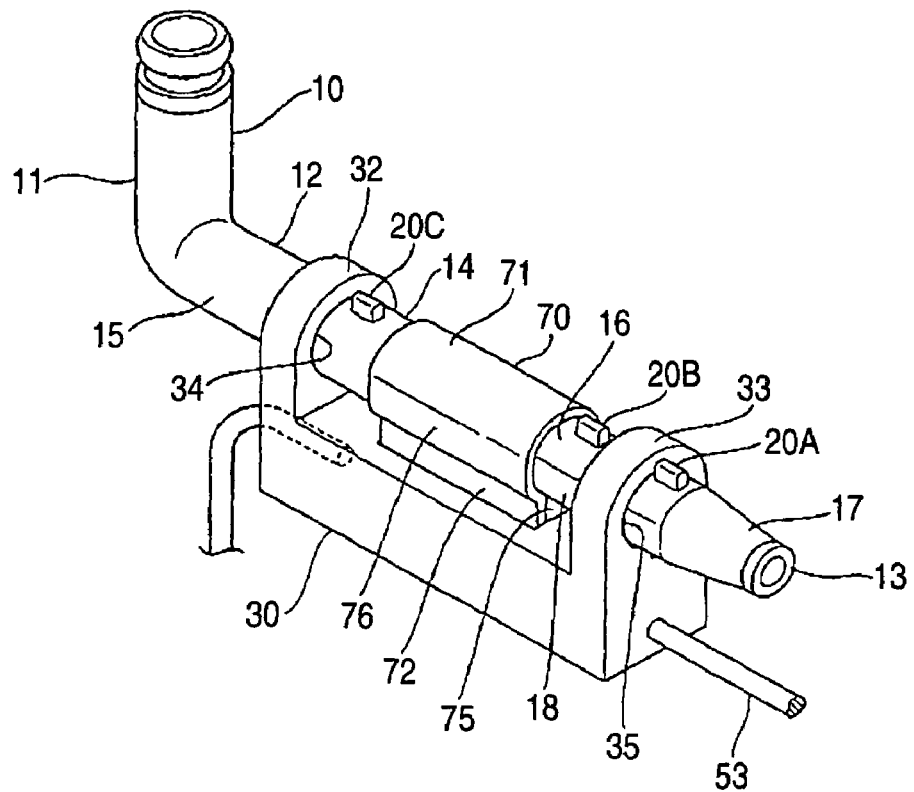
FIG. 9 is a view of an important portion similar to FIG. 3, but showing another embodiment of a vehicular sun visor of the invention.
Figure 10:
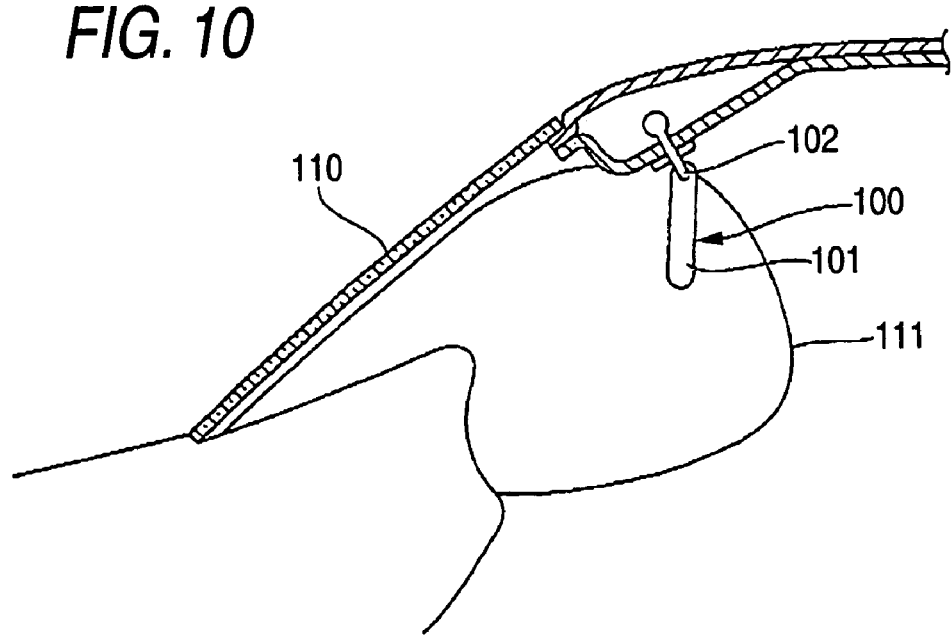
FIG. 10 is a view showing a condition in which a driver's seat airbag is deployed when a conventional sun visor is located along a front glass.
Figure 11:
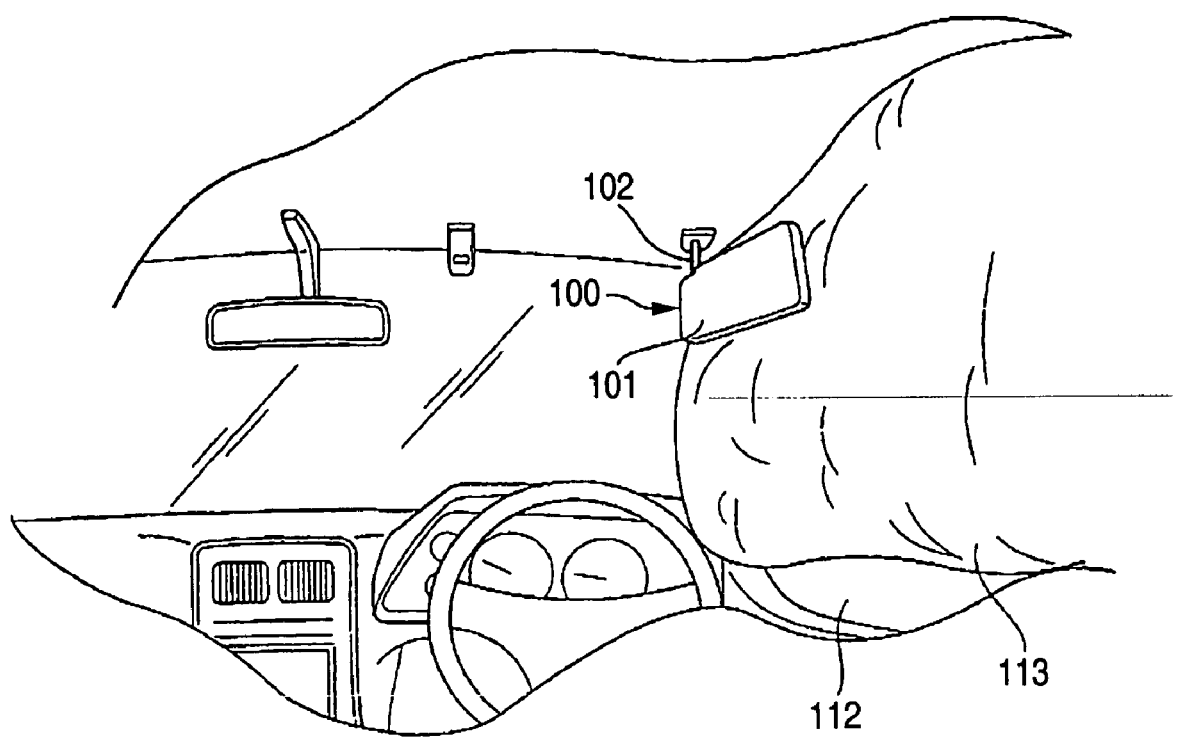
FIG. 11 is a view showing a condition in which a side airbag is deployed when the conventional sun visor is located along a front door glass.

In the above embodiment, although the two projections are provided, three or more projections can be provided, in which case retaining portions, corresponding respectively to these projections, are provided. For example, in the case where three projections are provided, a third projection 20C is formed on the larger-diameter portion 15 of the shaft 10 as shown in FIG. 9, and this third projection 20C is disposed between the bearing portion 32 of the holder 30 and the tubular portion 71 of the stabilizer 70. In this case, the distance between the third projection 20C and the bearing portion 32 may be made larger than the distance between the second projection 20B and the tubular portion 71, and the distance between the second projection 20B and the tubular portion 71 may be made larger than the distance between the first projection 20A and the bearing portion 33, or this distance relation can be reversed, or the distance between the second projection 20B and the tubular portion 71 can be made the largest. Even when any distance relation is adopted, the impact can be distributed or divided with time so as to control the load. Furthermore, the third projection 20C may be made of a resin, or may comprise a metallic projecting piece covered at its outer surface with a resin as described above for the first projection 20A.

The projections may be disposed in alignment with each other on the shaft.

This invention can be applied to both of sun visors provided respectively for a driver's seat and a front passenger seat adjacent to the driver's seat.

What is claimed is:

1. A sun visor for a vehicle comprising:
    a shaft angularly movably mounted on a roof surface within a passenger compartment of the vehicle;
    a shielding member angularly movably mounted on the shaft;
    a bearing member, in which the shaft is angularly movably inserted, provided at an end portion of the shielding member;
    a plurality of projections formed on the shaft and spaced from each other in a direction of an axis of the shaft; and retaining portions capable to abut respectively against the projections provided at the bearing member, wherein the bearing member has passage portions, and the projections can pass through the corresponding passage portions outside the range of angular movement of the shielding member mounted on the vehicle, and the distances of the projections from the respective retaining portions are different from one another.

2. The sun visor for a vehicle according to the claim 1, wherein the number of the projections is two.

3. The sun visor for a vehicle according to the claim 1, wherein the number of the projections is more than three.

4. The sun visor for a vehicle according to the claim 1, wherein the projections are made of resin.

5. The sun visor for a vehicle according to the claim 1, wherein the projections comprise a metallic projecting piece covered at the outer surface thereof with a resin.

6. The sun visor for a vehicle according to the claim 1, wherein the projections are disposed in alignment with each other on the shaft.

* * * * *